May 23, 1939.  H. W. GREIDER ET AL  2,159,587
APPARATUS FOR MAKING BITUMINIZED WEBS
Original Filed July 20, 1933   2 Sheets-Sheet 1
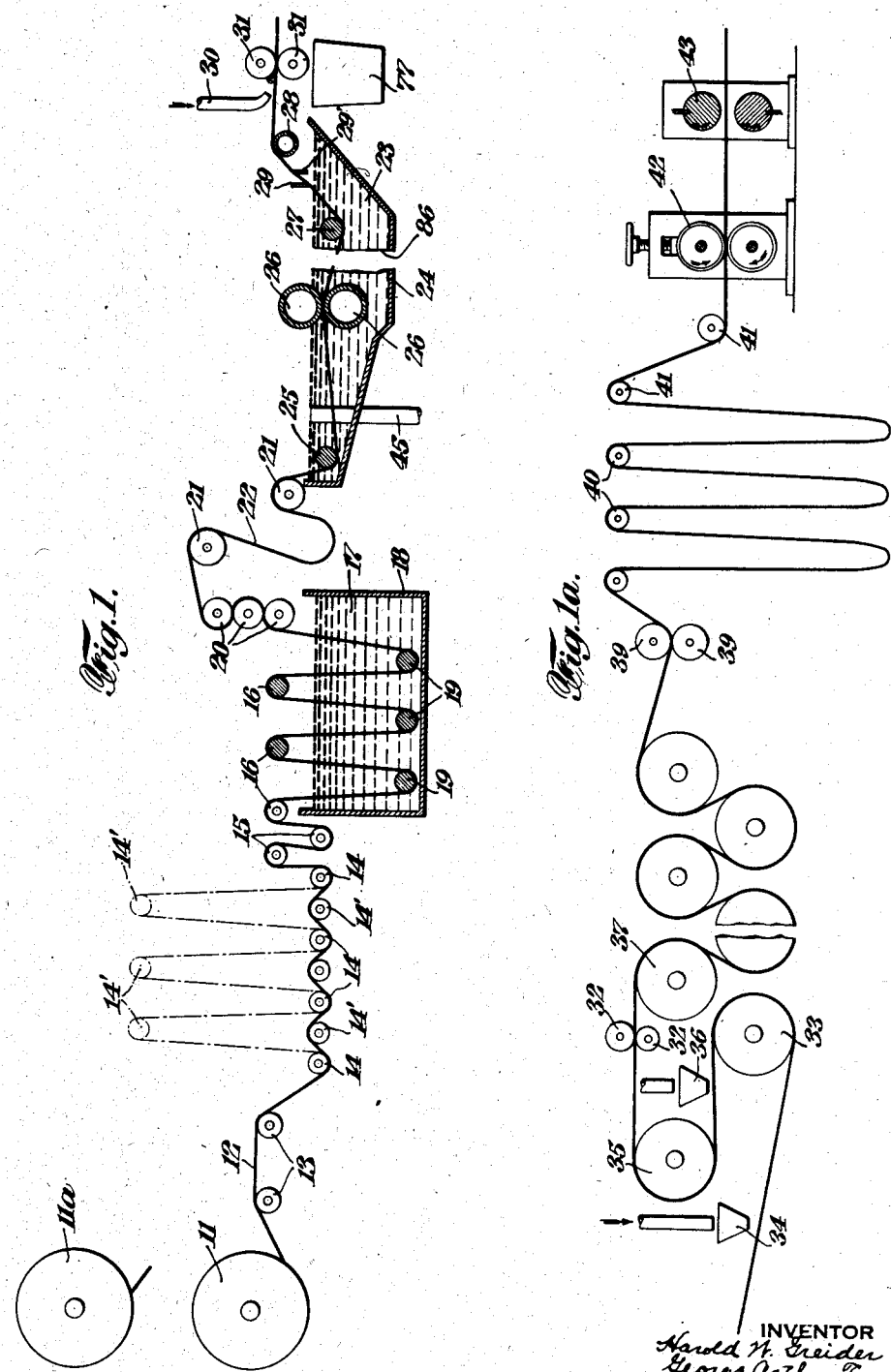
INVENTOR
Harold W. Greider
George Arthur Fasold
BY
George H. Mills, Jr.
ATTORNEYS May 23, 1939. H. W. GREIDER ET AL 2,159,587
APPARATUS FOR MAKING BITUMINIZED WEBS
Original Filed July 20, 1933 2 Sheets—Sheet 2
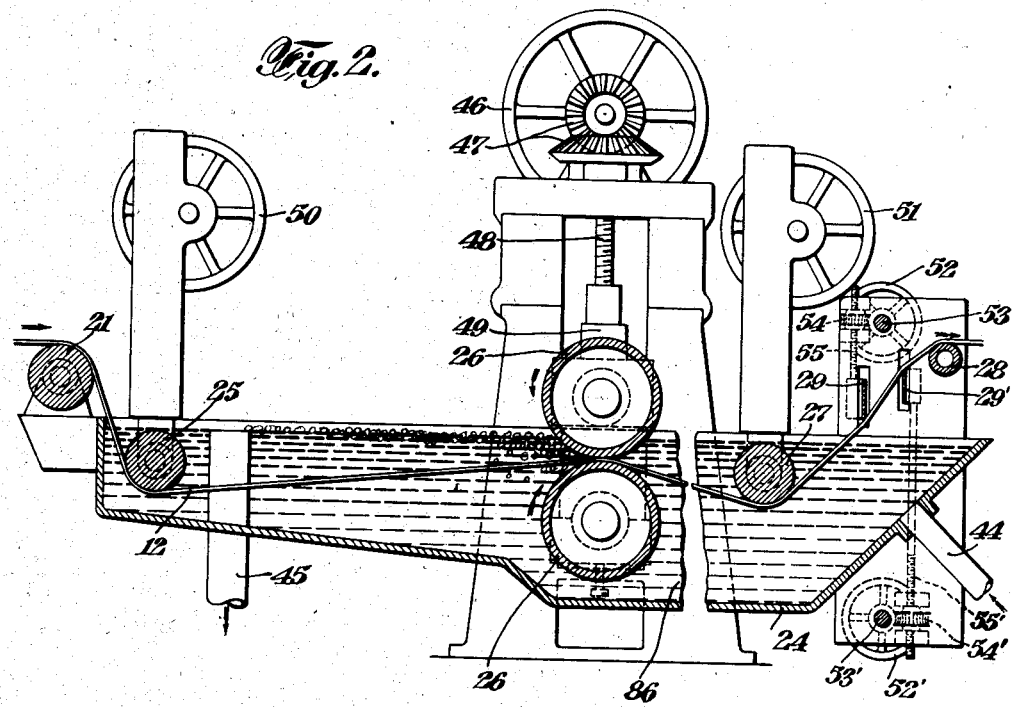
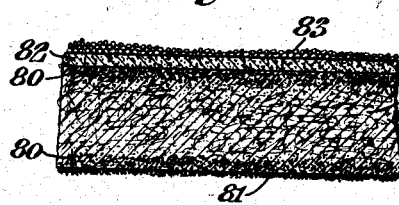
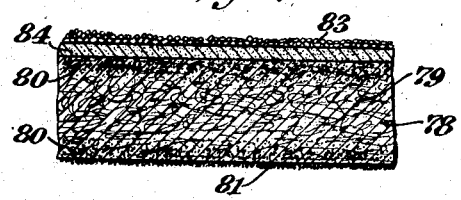
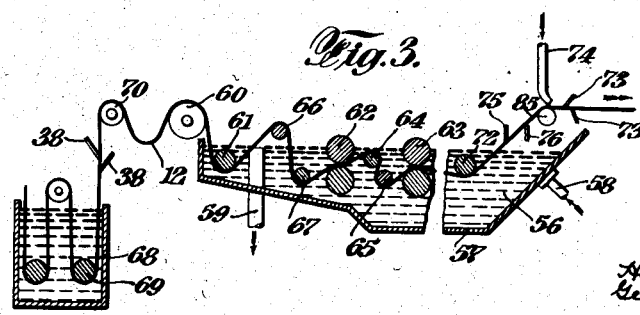
INVENTOR
Harold W. Greider
George Arthur Farold
BY
George H. Mills, Jr.
ATTORNEYS Patented May 23, 1939

2,159,587

UNITED STATES PATENT OFFICE 2,159,587

APPARATUS FOR MAKING BITUMINIZED WEBS

Harold W. Greider, Wyoming, and George Arthur Fasold, Mount Healthy, Ohio, assignors to The Philip Carey Manufacturing Company, a corporation of Ohio Original application July 20, 1933, Serial No. 681,286. Divided and this application May 26, 1937, Serial No. 144,965

11 Claims. (Cl. 91—24)

This case is a division of application Serial No. 681,286, filed July 20, 1933, which is incorporated herein as a part of the disclosure of the present invention. The parent case fully discloses the method and apparatus or machine but claims only the method. The apparatus or machine is the subject of the instant case.

The invention relates to apparatus or machines for manufacturing bituminized roofing, and particularly to bituminized roofing comprising a foundation fabric, such as felt, impregnated and coated with bituminous compositions so as to provide building materials useful as weather resisting coverings,—e. g., roofing, sidings, and the like. For convenience in description such building materials whether used for roofing or for other purposes, will be referred to herein as "roofing" and the apparatuses or machines will be referred to as "roofing" apparatuses or machines.

Bituminized building material heretofore employed for roofing and siding contained a considerable number of voids caused by incomplete saturation during its manufacture. Accordingly when the material is exposed to the weather, moisture is absorbed either by direct application of water or by contact with moist air. This is due chiefly to the porosity of the sheet that results from incomplete saturation, but also in part to the porosity of the pulverulent or granular material which is adhered thereto and apparently affords communication with the internal minute air pockets or voids either through or along the side of the granular particles. Tests have shown that roofings heretofore made when soaked in water for one hour at 120° F. will absorb as much as 10% to 20% of water or will absorb from 10% to 30% water in twenty-four hours at 77° F. Further tests have shown that when such porous moisture laden roofing is exposed to hot summer weather, a multiplicity of bubbles or blisters about 1/16 inch or about 3/4 inch in diameter are formed which push up to the surface of the roofing and expose the felt base to the weather. The felt being unprotected at the blister points deteriorates rapidly. Moreover, a blistered roofing, particularly when the blisters are broken, is very unsightly as well as of low resistance to weathering.

Sliding results from the tendency of the bituminous surface coating and the adhered granular weather resisting material to move or slip with respect to the fabric foundation or base when exposed to summer heat. Sliding, of course, is particularly serious on inclined roofs or vertical walls. Frequently shingles of ordinary size exhibit 3/4 inch or more slide after having been in place for some time.

It is our aim to provide a roofing material which is devoided of air and effectively sealed against the penetration of air and moisture, and has included in its structure a layer which is of the character and is so associated with the foundation as to prevent relative movement of the components making up the roofing material. A roofing material of this construction is substantially non-blistering and/or non-sliding. The aim of this invention is to provide an apparatus or machine for making roofing of this character.

Broadly stated the invention resides in providing means for impregnating a web such as a sheet of felt for example with a suitable bituminous saturant in any suitable manner as by immersion in saturant in a saturating tank and then, after the web has been freed of excess saturant as by passing the same between doctor blades or squeeze rolls, providing means for immersing the web in a bath of hot bituminous coating material, with the web being compressed to be devoided of air and sealed with the coating material in this air devoided condition while immersed in said coating.

One feature of apparatus embodying this invention resides in the combination of means for saturating a web of material with a bituminous saturant, with means for removing excess saturant, squeezing members for devoiding the impregnated web, and means for coating the web of material with coating material while devoided. Further features of this invention reside in means for immersing the web material in coating material in the coating tank and squeeze rolls for devoiding the material in the coating tank. Special features of this invention relate to the combination of a saturating tank with a coating tank and means for removing excess saturant between the two tanks. Other features of this invention reside in the combination with the two tanks just mentioned of doctor blades or squeeze rolls between the tanks and squeeze rolls adapted to compress web material below the normal surface of coating material in the coating tank. Further features of this invention reside in means for adjusting the pressure on the squeeze rolls in the coating tank and in means for adjusting the position of doctor blades as web material is passed from the coating tank.

Another feature of this invention resides in the combination of immersion coating means with superficial coating and spreading means. Further features of this invention reside in the combination with saturating and coating tanks and devoiding means of coating and spreading means and means for dusting coated webs with finely-divided materials or imbedding the granular materials in the coating; and cooling and pressing the coated and dusted or granular-surfaced webs.

A further feature of this invention resides in affording a coating tank having an inlet and an outlet so positioned that a current of coating material in the tank is maintained counter to the movement of web material passing between squeeze rolls while submerged in coating material in said tank.

Further purposes, features and advantages of the invention will become apparent in the following description of an illustrative embodiment of this invention in connection with the accompanying drawings, wherein:

Fig. 1 is a schematic view of part of apparatus for making roofing including saturating and coating means, etc.

Fig. 1—a is a schematic view of a continuation of the apparatus of Fig. 1 including means for applying granules, dusting, cooling, pressing, etc.

Fig. 2 is a side view partly in section showing a coating bath embodying this invention, including squeeze rolls, rollers, doctor blades, etc.

Fig. 3 is a schematic view of a modified form of coating bath;

Fig. 4 is a sectional view of a roofing embodying this invention, and

Fig. 5 is a sectional view of a modified form of roofing material.

In the drawings, the reference character 11 indicates a roll of felt or other web, which is mounted upon suitable bearings (not shown) and which is adapted to be unwound by the withdrawal of a web 12 therefrom, the web passing first over idling rollers 13.

When a first roll of felt has become exhausted, the end of the felt from exhausted roll 11 can be attached to the end of a new roll of felt 11a. In order that the progress of the web 12 may be stopped for a sufficient length of time to permit the attachment of an end portion of the exhausted roll to a new roll of web material while not interrupting the progress of the web through the saturating means, a device for taking up slack and permitting the gradual withdrawal of said slack is afforded by stationary rollers 14 and vertically movable rollers 14' which latter are adapted by suitable means (not shown) to be elevated and lowered as desired. In the normal operation of the machine, the rollers 14' are in the position shown in solid lines. As a roll of web material becomes exhausted, the rollers 14' can be elevated to the position indicated in dotted lines. After a roll of web material has become exhausted and while the end of the web is being attached to a new roll of web material, the rollers 14' are gradually lowered so that the slack material carried thereon can be continuously fed into the rest of the apparatus. After the web has been joined to the new roll, the web from the new roll is fed through the apparatus while the rollers 14' are in the position shown in solid lines. Any suitable number of stationary rollers 14 and movable rollers 14' may be employed.

While it is not essential to the practice of this invention, the web material is preferably passed over any suitable number of drying rolls 15 which may be heated as with steam. The purpose of the drying rolls is to remove any moisture absorbed by the web from the air or elsewhere prior to the saturating step to be described.

The web of material is immersed in a bath of bituminous saturant by passing the same alternately over rollers 16 above the surface of the saturant 17 in saturating tank 18 and over rollers 19 which are submerged below the surface of the saturant 17. Any desired number of rollers 16 and 19 may be employed to the end that the web by passing over the rollers is thoroughly saturated with the bituminous saturant. After leaving the saturating tank 18, the web material is passed through rolls 20 which serve as removing means for removing from the surface of the web material any excess of saturant adhering thereto.

The web material impregnated with saturant is taken to the coating apparatus by means of rollers 21 between which the web of material is allowed to fall in a loop 22, so as to allow for different speeds of operation in passing the web material through the saturating tank on one hand and the coating operation on the other.

In the coating mechanism, the web material impregnated with saturant is immersed below the surface of the melted bituminous coating material 23 in coating tank 24 by means of the roller 25. While the web material is beneath the surface of the coating material 23 it is passed between squeeze rolls 26. The web material after emerging from the squeeze rolls 26 is carried beneath the surface of the coating material and passes under roller 27 and over roller 28 between which doctor blades 29 and 29' are mounted above the surface of the bath for removing excess coating material from the surface of the web. The tank 24 is shown broken at 86 to indicate that the tank may be made of sufficient length to permit the web to fully expand after it is relieved of compression by rolls 26.

In order to afford a layer of coating material of sufficient thickness on a surface of the web, the web material which has been filled and sealed by the apparatus above described, may be passed in operative relation with respect to means for applying coating material to the desired surface. For example, coating material may be applied to the surface of the web by means of pipe 30 and the excess coating material thus applied may be spread to desired thickness by means of spreader rolls 31.

By the above apparatus, the web has been filled with saturant material and sealed with coating material while devoided of air. Moreover, a layer of coating material has been applied to one surface of the web to desired thickness. The web so filled, sealed and coated may now be passed about drum 33. A granular material such as slate granules is fed upon the coated surface of the web from a hopper 34. In passing from drum 33 to drum 35, the web of material is inverted and a coating of fine material such as fine mica flakes is applied to the reverse side of the web from hopper 36. Thus the roofing is coated by suitable application means with finely divided solid material, the type of solid material being regulated on either side as desired. Pressure may be applied to the web by suitable rolls 32 to properly imbed the granular material in the coating.

The web of roofing material is cooled by passing the same over any suitable number of drums 37 which may be cooled by means of water, for example. The roofing may then be compressed to final form by means of press rollers 39.

If the roofing is to be marketed in roll form, the roofing may be taken from press rolls 39 and wound in rolls in any suitable manner (not shown).

If the roofing material is to be cut into shingles, it is preferably festooned on a plurality of traveling slack holding bars 40 which carry a relatively large amount of slack material. The roofing material is taken from the slack holding bars 40 over guide rollers 41 to a device for cutting the roofing longitudinally which is indicated generally by the reference character 42 and to a device for cutting the longitudinal strips into suitable lengths which is indicated generally by the reference character 43. Thus any suitable form of and shape of shingles or shingle strips or squares may be cut from the roofing material. The cut material can be collected and baled in any suitable way for marketing.

Referring to Fig. 2, a coating bath which may be employed in the practice of this invention is shown in detail for the purpose of illustrating one manner in which an embodiment of the invention may be made. In the description of this invention in connection with Fig. 1, reference has already been made to rollers 21, 25, 27 and 28 and these reference characters indicate the corresponding parts in Fig. 2. The web of material 12 is passed between squeeze rollers 26 already described in connection with Fig. 1. Preferably, the inlet 44 for supplying the coating tank 24 with fresh bituminous coating material is located adjacent the part of the tank 24 which is on the side of the squeeze rollers 26 at which the web material is discharged after compression by said rollers. Moreover, the outlet 45 for the tank is preferably on the side of the squeeze rollers 26 on which the web of material 12 is taken between the squeeze rolls. It is a feature of this invention that the flow of bituminous coating material in tank 24 is controlled so that the bubbles formed by air expelled from the web 12 by passing the web between squeeze rollers 26 are carried away from the squeeze rollers and are not permitted to mingle with the coating material on the side of the squeeze rolls at which the web is withdrawn. Thus, the re-absorption of air into the web is prevented.

In the apparatus for carrying out the invention, means are preferably employed for regulating the amount of pressure exerted upon a web of material passing between squeeze rolls 26. In Fig. 2, such means are shown as comprising a hand wheel 46 which operates through beveled gears 47 to turn threaded rods 48 for the elevation and lowering of bearing blocks 49 in which one of the squeeze rolls is mounted. By the means just described, the squeeze rolls may be moved so as to become more adjacent to or more remote from each other as desired in regulating the pressure exerted upon a web of material passing between the squeeze rolls but any other suitable arrangement for regulating the pressure of the squeeze rolls on the web may be used. Preferably, the rollers 25 and 27 are adjustable so as to control the travel of the web 12 through the coating bath contained in tank 24. The adjusting means is shown in the form of hand wheels 50 and 51 which operate in any suitable manner to elevate and lower rollers 25 and 27 respectively. Means are afforded for regulating the position of doctor blades 29 and 29' with reference to the web material 12 passing between guide rollers 27 and 28. The position of the doctor blade 29 is regulated by hand wheel 52 which acts through worms 53 and worm wheels 54 and threaded rods 55 to move the doctor blade 29. The position of doctor blade 29' is regulated by the corresponding parts 52', 53', 54' and 55'.

A modified form of coating bath is shown in Fig. 3. Bituminous coating material 56 is contained in a tank 57. Fresh coating material is charged into tank 57 through inlet 58 and excess coating material is withdrawn through outlet 59. A web of material 12 passes into the tank over a roller 60 and is submerged in the coating material 56 by means of a submerged roller 61. The web of material is shown in Fig. 3 as passing between squeeze rolls 62 and 63. The purpose of the second squeeze rollers 63 is to complete the devoiding of the web in case the web is not completely devoided by squeeze rollers 62. Any plurality of squeeze rollers may be employed in the coating bath to devoid the web.

To further assist in devoiding the web of air, the travel of the web through the tank may be increased and regulated by guide rollers 64 and 65. Thus, if desired, the immersion of the web in the bituminous coating material may be prolonged and the web may be flexed, thus assisting in the devoiding of the web. If desired, a guide roller 66 may be provided above the surface of the coating in the coating tank so that the temperature of the web 12 passing therethrough may be prevented from rising to an excessively high degree. In such case, the web of material can be taken to squeeze rollers 62 over roller 67. Means may be afforded for adjusting the position of any of the rollers 64, 65, 66 and 67 as desired.

It is one of the features of this invention that a web of material is saturated with a bituminous saturant, any excess saturant being removed from the surface thereof, and is immediately thereafter immersed while hot in a tank of coating material. Apparatus for performing such an operation is shown in Fig. 3, wherein a tank 68 of saturant 69 is shown from which the web of material is taken over guide roller 70 after having been taken past doctor blades 38 to remove excess saturant. The web of material is then taken to guide roller 60 and is immediately immersed in the coating material in tank 57, reducing the travel between doctor blades 38 and the point of immersion into the coating material to a minimum. For example, the distance between the doctor blades 38 and the point at which the web is immersed in bituminous coating material contained in tank 57 may be reduced to 3 or 4 feet. Moreover, the rate of movement of the web as it is passed progressively through the apparatus is preferably such that the web will pass from the doctor blades 38 to coating material in tank 57 in the shortest possible time. While this feature of this invention has been described in connection with particular apparatus, it is to be understood that the method step involving the control of rate of web movement and distance of web travel between the saturating and the coating operations so that the web will only have a few seconds to cool may be practiced with any type of apparatus. In other words, the web is passed to the coating bath before it has had time to cool substantially.

A further feature of this invention is also shown in Fig. 3 and resides in applying coating material to a web of material immediately after the web of material has been removed from a bath of bituminous coating material. Thus, in Fig. 3, the web of material is taken from the bath after having passed under roller 72 and is passed directly over guide roller 85 and to doctor blades 73 in front of which coating material is applied from pipe 74. Prior to the application of coating from pipe 74, the web is preferably passed over doctor blades 75 and 76 to remove excess coating adhering to the web upon its removal from the coating bath. The doctor blades 73 can be placed over the tank 57 when the coating material applied from pipe 74 is similar in character to the coating material admitted into the tank through inlet 58.

In cases where a special superficial coating is desired, such as a coating mineralized with fine inorganic materials and the superficial coating is to be different from the sealing coating applied by immersion of the web in a bath of the coating material, the coating doctor blades or spreading rollers are not positioned over the tank of coating material, but are positioned to one side thereof as shown in Fig. 1.

Preferably the second superficial coating of coating material is applied to the web as soon as possible after the web has been removed from the coating material and before the web has had an opportunity of becoming substantially cooled. For example, it is preferable to arrange the rate of movement of the web and the distance of travel between the coating bath and the point of application of the second coating of coating material so that the time for the web to cool will be reduced to not more than a few seconds and the web will not have had an opportunity of becoming substantially cooled.

In Fig. 1, excess coating material applied by pipe 30 is collected in a special receptacle 77. In Fig. 3 the excess coating material is collected in a suitable member of tank 57.

While the operation of the above apparatus is apparent it will be briefly described as follows:

A web of material 12 is unrolled from either of the rolls 11 or 11a and is passed progressively through a saturating tank 18 where it is impregnated as thoroughly as possible with bituminous saturant. The thoroughly impregnated web is taken from the saturating tank to rolls or doctor blades which remove excess saturant from the surface of the web. Preferably, after leaving the rolls only small amounts of saturant remain unabsorbed by the web material. It has been found in practice that it is desirable to have the web come from the rolls in a "spotted" condition, namely, having certain areas of the web appearing wet and certain areas of the web appearing dry. If too great amounts of saturating material are left adhering to the surface of the web, this material acts as a lubricant for higher melting point coating material applied thereto with the result that the finished product has a tendency to slide. If the saturated felt is made too "dry", it is difficult to remove all the air from the felt prior to the coating and sealing of the felt.

The web is preferably in the practice of this invention immersed in the bath of coating material as quickly as possible so as to avoid the absorption of air by the web which would otherwise occur due to the cooling of the web and to the expansion of the web after having passed from the rollers or doctor blades. Preferably, though it is not essential to the practice of this invention, the web is not permitted to cool substantially, e. g. more than a few degrees, in passing from the saturating bath to the coating bath. The immersion of the web in hot coating material partially devoids the web. While the web of material is immersed in the bath of coating material, it is pressed by squeeze rollers preferably to a definitely greater extent than that resulting from the pressure of the rolls or other saturant removing means at the conclusion of the saturating bath. As the web passes between the squeeze rolls beneath the surface of the coating bath a foam of bubbles occurs in the coating material. This foam is preferably withdrawn from the tank and the occurrence of the foam in the bath at a point at which it could contact with the web after the web has passed from the squeeze rolls is avoided. The web, after having passed from the squeeze rolls in the coating bath expands and sucks in the coating material to replace the air that has been expelled from the web. The web is thus not only filled with saturant but also is sealed with coating material which permeates the web surface layer and keeps the web is a permanently devoided condition. It is to be noted that the web is maintained devoided during the coating operation. After leaving the coating bath, excess coating material can be removed as by doctor blades. After the web has been filled with bituminous saturant and sealed with bituminous coating material as above described, the web can be used without coating the material further. For example, the filled and sealed web can be used as a flooring or for the construction of multi-ply "built up" roofing or for pipeline covering. For roofing purposes, however, it is preferable to apply a second layer of coating material to give increased resistance to weathering and to afford a layer of sufficient thickness to hold adherently a finely divided, e. g., granular solid material such as slate granules of suitable color. It is preferable to apply the second coating before the cooling of the web can cause air to be sucked into the web. Additional coatings with bituminous material can be applied if desired but ordinarily are not necessary. The web, after it has been coated on the front and back with suitable granular or pulverulent materials and cooled, may be marketed in the form of roll roofing or as cut into suitable shapes and sizes.

In carrying out the invention above described, it is desirable to devoid the web of material as much as possible prior to coating the same with coating material in a devoided condition. In usual practice the amount of voids in the ultimate product can be reduced to such a point that blistering of the roofing when subjected to weathering is substantially avoided. Thus the roofing is rendered substantially free of voids and is permanently sealed in such a condition. The degree of devoiding can be increased by subjecting the web to more than one compression to drive out air contained in the felt, by prolonging the coating application and the like. The apparatus manufactured as above described has been found, however, to devoid the web sufficiently completely and to seal the web in a devoided condition without burning the web by too long immersion in coating material heated to a relatively high temperature.

The saturating material is preferably a relatively low softening point asphalt. The lower softening point asphalts are more resistant to weathering and are more flexible. Moreover, in melting them sufficiently to permit a web to be impregnated therewith, they do not have to be heated to temperatures which are so high that burning and weakening of the web occurs during the time that is required to impregnate a dry web.

Preferably, a saturant is used which has a softening point of 95° F. to 140° F. as determined by the ball and ring method and which has a penetration of about 10 to 130 at 77° F. as determined with a Dow penetrometer. Considerable latitude below and above the preferred figures above given, e. g., the use of materials having a softening point of about 75° F. to about 200° F. with a penetration of about 5 to 200 at 77° F. is permissible, having in mind that if a bituminous saturant having too low a softening point is used, the product will be too soft and too flexible and that if a saturating material having too high softening point is used there is likelihood of burning the web during the saturating step and of producing a product which is too rigid and subject to excessive cracking when flexed and of reduced resistance to weathering.

The saturating asphalt is preferably applied at a temperature of about 350° F. to 400° F. although the temperatures named are not regarded as critical.

The bituminous coating material has a softening point which is preferably between about 220° F. and about 250° F. and has a penetration of about 9 to about 20 at 77° F. However, satisfactory results can be obtained when the softening point ranges from about 190° F. to about 275° F. and the penetration ranges from about 50 to about 5 at 77° F. The coating material is preferably applied at about 425° F. although about 50° to 75° F. variation from this figure will still afford satisfactory results. When a second coating is applied, the web is preferably not permitted to cool more than a few degrees before it is applied.

The softening point and penetration of the coating material (and saturant) that is used depends somewhat on the climate in which the roofing material is to be used. The bituminous saturating and coating materials are preferably used in a condition which is as free of air bubbles as possible.

One embodiment of a roofing made in accordance with this invention is shown in Fig. 4. The roofing comprises a web 78 of material such as felt. The web material is impregnated with a saturant 79. A sealing coat of bituminous coating material is indicated by the reference character 80. The sealing coating preferably has a higher softening point than the softening point of the saturant 79. Preferably, also the sealing coat 80 impregnates the web 78 adjacent the surfaces thereof so that the web 78 is impregnated at one portion thereof with a bituminous saturant and is impregnated in another portion thereof and adjacent the surfaces thereof with a coating material of higher softening point than said saturant. Thus there is an inner layer of felt impregnated with a saturant and two overlying layers of felt impregnated with a coating material having a higher softening point than said saturant, and the felts in the layers are interfelted with each other. At one side of the roofing, a thin surfacing 81 of pulverulent material such as fine mica flakes may be applied. At the opposite surface of the roofing, the surface coating or layer 82 of bituminous coating material is applied and overlies layer 80 and the felt in layer 80.

In Fig. 4, the bituminous material in layers 80 and 82 are substantially identical and become merged with one another so that a coating material is afforded comprising bituminous coating material which impregnates the felt and is keyed thereto and a surface layer 82 which overlies the felt and which has substantial thickness and weather-resistance. Adherent to the layer 82, a surfacing 83 of granular or finely divided solid material may be applied of any suitable size or color. The surfacing 83 may consist of granular solid particles of suitable colored slate, for example.

A modified embodiment of roofing which may be made with the apparatus of this invention is shown in Fig. 5. The structure in Fig. 5 is identical with that of Fig. 4 except that in place of the layer 82 shown in Fig. 4 a layer 84 is employed of a coating material which is substantially different from the coating material contained in layer 80. Thus, for example, a coating material having a different softening point from the melting point of the coating material contained in layer 80 may be employed. Moreover, the coating material in layer 84 may comprise a finely divided inorganic solid material in certain cases as desired.

As above stated, it is preferable too that the roofing contain less than about 2.0% of voids. Moreover, it is also preferable that the total weight of material overlying the felt base of the roofing and including the bituminous coating material and finely divided solid surfacing material be less than about 45 pounds per 100 sq. ft. so as to minimize a tendency of overlying material to slide.

The roofing products may also be manufactured without layer 82 or layer 83, for example, to be used as the felt in built-up roofing construction. Moreover, a variety of superficial coatings of dust or granular materials, or liquids such as paint and the like, may be applied for protective or ornamental purposes, or both.

While this invention has been described in connection with certain specific illustrations it is to be understood that this has been done for the purpose of illustration and that this invention is not to be limited thereby. Moreover, it is also to be understood that the term "roofing" includes roll and shingle roofing, siding strips, and other building materials of the character described, all of which may be made in accordance with the invention.

We claim:

1. In apparatus for impregnating and coating a web with bituminous material, the combination comprising impregnating means for impregnating a web with a bituminous saturant, squeezing means including members adapted for pressure contact with opposite surfaces of said web to devoid said web by sequeezing said web, and means separate from said impregnating means to supply bituminous coating material having a higher softening point than the softening point of said saturant to said opposite surfaces of said web simultaneously with the removal of said surfaces from contact with said members.

2. In apparatus for impregnating and coating a web with bituminous material, the combination comprising a tank adapted to contain bituminous saturant, means for immersing a web in bituminous material contained in said tank, means removing said web from said saturant contained in said tank, a second tank adapted to contain bituminous coating material, squeezing members adapted for pressure contact with opposite surfaces of said web and means for operating said squeezing members to squeeze the opposite surfaces of said web therebetween, thereby devoiding said web, and to remove said members from said surfaces of said web when said web is submerged beneath the normal level of bituminous coating material contained in said second tank.

3. In apparatus for impregnating and coating a web with bituminous material, the combination comprising impregnating means for impregnating a web with bituminous saturant, means for removing any excess saturant from a surface of said web after said web has been impregnated with said saturant, a tank separate from said impregnating means adapted to contain bituminous coating material, means for immersing said web of material beneath the surface of bituminous coating material contained in said tank, and squeezing means adapted for squeezing said web to substantially reduce thickness to thereby devoid said web and for relieving the squeezing pressure on said web while said web is immersed in coating material contained in said tank.

4. In apparatus for impregnating and coating a web with bituminous material, the combination comprising impregnating means for impregnating a web with bituminous saturant, removing means for removing any excess saturant from the surface of said web after said web has been impregnated with said saturant, squeezing means including members adapted for pressure contact with opposite surfaces of said web to devoid said web by squeezing said web after excess saturant has been removed from the surface thereof by said removing means, and means separate from said impregnating means to supply bituminous coating material to said opposite surfaces of said web simultaneously with removal of said surfaces from contact with said members.

5. In apparatus for impregnating and coating a web with bituminous material, the combination comprising impregnating means for impregnating a web with bituminous saturant, squeeze rolls adapted to roll and progressively squeeze said web to devoid said web after said web has been saturated by said impregnating means, and means adapted to contain bituminous coating material independent of said saturant and to supply said coating material to opposite surfaces of said web immediately adjacent said squeeze rolls upon said web leaving said squeeze rolls.

6. In apparatus for impregnating and coating a web with bituminous material, the combination comprising impregnating means adapted for impregnating a web with bituminous saturant, removing means for removing excess saturant from the surface of said web, a tank adapted to contain a supply of bituminous coating material independent of said saturant, squeeze rolls in said tank adapted to roll and progressively squeeze said web while said web is submerged beneath the normal surface of bituminous coating material contained in said tank after excess saturant has been removed from the surface thereof, and means for increasing and diminishing the pressure exerted by said rolls upon a web of material therebetween.

7. In apparatus for impregnating and coating web material, the combination comprising a first tank adapted to contain bituminous saturant, a second tank adapted to contain bituminous coating material, means for passing a web of material through said first tank so as to be contacted with saturant contained in said tank, removing means between said first and second tank for removing excess saturant from a surface of said web after removal of said web from said first tank, means for passing said web from said removing means through coating material contained in said second tank, rollers in said second tank adapted to apply pressure to said web and to relieve said web of pressure while said web is being passed through and is immersed in bituminous coating material contained in said second tank, and means for removing excess coating material from said web after removal of said web from said second tank.

8. In apparatus for impregnating and coating a web, the combination comprising a saturating tank adapted to contain bituminous saturating material, a coating tank adapted to contain bituminous coating material, removing means between said tanks adapted to remove excess saturant from a web of material passed therebetween, squeeze rolls adapted to compress web material beneath the surface of coating material contained in said coating tank, means for passing a web of material progressively through saturant in said saturating tank, in operative relation to said removing means and between said squeeze rolls beneath the surface of coating material contained in said coating tank, means for withdrawing the web from said coating tank, and means including a roller spaced from said squeeze rolls adapted to maintain said web below the surface of coating material contained in said coating tank for a substantial distance of travel of said web from said squeeze rolls to said means for withdrawing said web from said tank.

9. In apparatus for impregnating and coating a web with bituminous material, the combination comprising saturating means for impregnating web material with bituminous saturant, a tank adapted to contain bituminous coating material, rolls between said saturating means and said tank adapted to remove excess saturant from the opposite surfaces of said web, squeeze rolls in said tank adapted to compress said web material beneath the normal surface of coating material contained in said tank, means for progressively passing a web of material in operative relation with respect to said saturating means, said rolls and said squeeze rolls, and means for increasing and diminishing the pressure exerted on said web of material by said squeeze rolls.

10. In apparatus for making roofing, the combination comprising a tank adapted to contain bituminous coating material, means for passing a web of material through coating material contained in said tank, an inlet and an outlet for admitting and withdrawing coating material from said tank, said inlet and said outlet being positioned so that coating material flowing from said inlet to said outlet will flow counter-current with respect to the normal movement of said web in passing through said tank, squeeze rolls between said inlet and said outlet adapted to compress said web and relieve said compression while said web is submerged below the normal surface of bituminous coating material contained in said tank, and means for urging said squeeze rolls toward each other to compress a web of material passing therebetween.

11. In apparatus for making roofing, the combination comprising a tank adapted to contain bituminous coating material, means for passing a web of material progressively through said tank including a first roller in said tank adapted to submerge the web in coating material contained in said tank, a second roller in said tank adapted to maintain the web submerged in coating material in said tank, squeeze rolls between said first and second rollers adapted to compress the web below the normal surface of coating material contained in said tank in passing from said first to said second rollers, a third roller above the normal surface of coating material contained in said tank, doctor blades above the normal surface of coating material in said tank and between said second and third rollers, coating means for applying coating material to the surfaces of said web after leaving said doctor blades, and means for spreading coating material thus applied to desired thickness, said tank including a member for receiving any excess coating material applied by said coating means.

HAROLD W. GREIDER.
GEORGE ARTHUR FASOLD.